United States Patent
Mirsky (10) Patent No.: US 10,979,787 B2
(45) Date of Patent: Apr. 13, 2021

(54) TECHNIQUES TO COLLECT AND TRANSPORT TELEMETRY INFORMATION IN A COMMUNICATION NETWORK

(71) Applicant: ZTE Corporation, Guangdong (CN)

(72) Inventor: Gregory Mirsky, Pleasanton, CA (US)

(73) Assignee: ZTE Corporation, Shenzhen (CN)

( * ) Notice: Subject to any disclaimer, the term of this patent is extended or adjusted under 35 U.S.C. 154(b) by 149 days.

(21) Appl. No.: 16/127,213

(22) Filed: Sep. 10, 2018

(65) Prior Publication Data

US 2020/0084522 A1    Mar. 12, 2020

(51) Int. Cl.
*H04Q 9/02* (2006.01)
*H04L 12/26* (2006.01)
*H04L 12/801* (2013.01)

(52) U.S. Cl.
CPC ........... *H04Q 9/02* (2013.01); *H04L 43/0864* (2013.01); *H04L 47/34* (2013.01); *H04L 2212/00* (2013.01)

(58) Field of Classification Search
None
See application file for complete search history.

(56) References Cited

U.S. PATENT DOCUMENTS

| | | | | |
|---|---|---|---|---|
| 2014/0177653 A1* | 6/2014 | Tzeng | ................... | H04J 3/0635 370/503 |
| 2017/0324497 A1* | 11/2017 | Ruffini | ................... | H04L 45/02 |
| 2017/0353367 A1 | 12/2017 | Slaight et al. | | |
| 2018/0219736 A1 | 8/2018 | Bugenhagen et al. | | |
| 2019/0141168 A1* | 5/2019 | Bhandari | ............. | H04L 67/2804 |
| 2020/0052979 A1* | 2/2020 | Clemm | ................ | H04L 41/5009 |
| 2020/0067792 A1* | 2/2020 | Aktas | ................... | H04L 41/5009 |

FOREIGN PATENT DOCUMENTS

| | | |
|---|---|---|
| CN | 108111432 A | 1/2018 |
| CN | 108011837 A | 5/2018 |

OTHER PUBLICATIONS

In-Band Network Telemetry (INT) Dataplane Specification Version 1.0 Apr. 20, 2018 Downloaded from http://p4.org/specs/ (Year: 2018).*
ISA/CN, International Search Report and Written Opinion for PCT/CN2019/105163, dated Dec. 2, 2019.

* cited by examiner

*Primary Examiner* — Jeffrey M Rutkowski
*Assistant Examiner* — Basil Ma
(74) *Attorney, Agent, or Firm* — Perkins Coie LLP (57) ABSTRACT

The disclosed techniques can collect and transport telemetry information on-path when a packet of a service flow traverses a communication network. The collected telemetry information can be analyzed to identify potential issues experienced by a user of a service and simplify the association of data with the service. Thus, apparatuses, methods, computer readable media, and systems are disclosed for an on-path collection and transportation of telemetry information in a communication network.

18 Claims, 10 Drawing Sheets

FIG. 1A

| Version 102 | Shim Length 104 | Sequence Number 106 |
|---|---|---|
| Telemetry Data Profile 108 ||||

TECHNIQUES TO COLLECT AND TRANSPORT TELEMETRY INFORMATION IN A COMMUNICATION NETWORK

TECHNICAL FIELD

The present document relates to collecting and transporting telemetry information in a communication network.

BACKGROUND

A communication network may include one or more paths that can be traversed by a packet, such as an Internet Protocol (IP) packet. A communication network performs measurements to characterize the network conditions. Based on the measured performance, a computing device may determine whether to change the flow of the packet or whether to allocate computational resources so that the packet can efficiently traverse the communication network.

SUMMARY

An exemplary first embodiment discloses a packet communication method, comprising receiving a first packet by a network node, where the first packet is constructed to trigger collection of one or more telemetry data, and transmitting the first packet and a second packet to another network node, where the second packet is transmitted in response to receiving the first packet, and where the second packet includes the one or more telemetry data according to the first packet.

In some implementations for the first embodiment, the network node generates the second packet in response to receiving the first packet, and where the network node is a first network node in a series of one or more network nodes traversed by the first packet and the second packet. In some implementations for the first embodiment, the network node collects the one or more telemetry data to be included in the second packet in response to receiving the first packet. In some implementations for the first embodiment, the second packet includes metadata that includes a version indicator, a length of the metadata, a sequence number that indicates a sequence within which a packet belongs, and a telemetry data profile that indicates the one or more telemetry data included in the second packet.

An exemplary second embodiment discloses a packet communication method, comprising receiving a first packet by a first network node, where the first packet is constructed to trigger collection of one or more telemetry data, starting a timer in response to receiving the first packet, transmitting the first packet to a second network node, receiving a second packet by the first network node after receiving the first packet while the timer is running, in response to determining that the second packet has space to add the one or more telemetry data: adding the one or more telemetry data to the second packet, stopping the timer, and transmitting the second packet to the second network node.

In some implementations for the second embodiment, the first network node is configured to collect and send the one or more telemetry data based on the first packet received from another network node. In some implementations for the second embodiment, the first network node collects the one or more telemetry data to be included in the second packet in response to receiving the first packet. In some implementations for the second embodiment, the method further comprises: in response to determining that the second packet lacks space to add the one or more telemetry data: obtaining, from the second packet, a service path information that indicates a service path of the second packet, transmitting the second packet to the second network node, generating a third packet to include the service path information and the one or more telemetry data, stopping the timer, and transmitting the third packet to the second network node.

In some implementations for the second embodiment, the second packet and the third packet include metadata that includes a version indicator, a length of the metadata, a sequence number that indicates a sequence within which a packet belongs, and a telemetry data profile that indicates the one or more telemetry data included in the second or the third packets.

In some implementations for the second embodiment, in response to receiving the first packet: storing a service path information that indicates a service path of the first packet, storing the one or more telemetry data, and transmitting the first packet to the second network node.

In some implementations for the second embodiment, the method further comprises in response to determining, by the first network node, that the timer has expired: generating another packet, adding to the another packet the service path information and the one or more telemetry data, and transmitting the another packet to the second network node.

An exemplary third embodiment discloses a packet communication method, comprising receiving a packet by a network node, where the packet is constructed to trigger collection of one or more telemetry data from one or more additional network nodes, and where the network node is configured to collect and assemble the one or more telemetry data sent by the one or more additional network nodes, receiving, by the network node, one or more additional packets after receiving the packet, storing the one or more telemetry data included in the one or more additional packets, and assembling the one or more telemetry data according to an order indicated by one or more sequence numbers included in the one or more additional packets.

In some implementations for the third embodiment, the method further comprises: starting or restarting a timer in response to receiving the one or more additional packets, where the one or more telemetry data is assembled in response to determining that the timer has expired. In some implementations for the third embodiment, the one or more additional packets includes metadata that includes a version indicator, a length of the metadata, a sequence number that indicates a sequence within which a packet belongs, and a telemetry data profile that indicates the one or more telemetry data included in the one or more additional packets.

In yet another exemplary aspect, the above-described methods are embodied in the form of processor-executable code and stored in a computer-readable program medium.

In yet another exemplary embodiment, a device that is configured or operable to perform the above-described methods is disclosed. For example, a network node comprising a processor configured to implement a method comprising: receiving a first packet by the network node, where the first packet is constructed to trigger collection of one or more telemetry data, and transmitting the first packet and a second packet to another network node, where the second packet is transmitted in response to receiving the first packet, and where the second packet includes the one or more telemetry data according to the first packet.

In some embodiments, the network node generates the second packet in response to receiving the first packet, and where the network node is a first network node in a series of one or more network nodes traversed by the first packet and the second packet.

In some embodiments, the network node collects the one or more telemetry data to be included in the second packet in response to receiving the first packet.

In some embodiments, the second packet includes metadata that includes a version indicator, a length of the metadata, a sequence number that indicates a sequence within which a packet belongs, and a telemetry data profile that indicates the one or more telemetry data included in the second packet.

The above and other aspects and their implementations are described in greater detail in the drawings, the descriptions, and the claims.

DETAILED DESCRIPTION

Generally, telemetry is a term for technologies that collect and transport the information in the form of measurements or statistical data from a source to a remote location for storing and/or processing. Telemetry process refers to the collection and transportation of the data, and telemetry information or telemetry data refers to data being collected and transported. Some examples of telemetry data to be collected include identifiers for service functions to trace a service function chain, ingress and egress time values to determine a delay or a delay variation on each entities of the service, central processing unit (CPU) utilization, queue length of a given service on ingress and egress, wall clock, or proof of transit information collected in an ordered manner.

Telemetry data and the telemetry protocols that collect and transport the telemetry data provide information to network control systems. The network control systems may use machine learning methods to analyze the telemetry data. In many cases, telemetry data is collected using streaming or publishing protocols. Such a conventional data collection approach provides insight into the network, allows detection of trends and take corrective measures to relieve possible congestion that may cause excessive packet delays or even packet loss. However, conventional data collection approaches make it harder to correlate network-wide patterns to a particular service to determine whether a contracted Service Level Agreement (SLA) is sustained by the particular service.

Some data collection and transportation protocols collect telemetry data using the data packets. While such approaches collect telemetry data on the path traversed by the data packet (i.e., in-band with the service traffic), such conventional approaches experience some technical challenges. One of the challenges is the amount of the telemetry information that can be collected. In conventional protocols, the packet that passes through the network domain is limited by the maximum transmission unit (MTU) size of the path and the length of the data packet itself. As a result, either some packets cannot be used to collect the telemetry or the information may be collected from a subset of the nodes traversed by the packet. Thus, some nodes may not be able to add telemetry information to a packet and telemetry data may offer limited information about the network. Another challenge is providing accurate and consistent data such as egress timestamp or egress queue length. The insertion of the telemetry data into the packet may require an update to, for example, the checksum value that is part of the Internet Protocol (IP) or user datagram protocol (UDP) header. Such an update, however, does not enable consistency because a value may not be obtained as the packet is being transmitted. Furthermore, if the integrity of the telemetry data is to be protected, for example using authentication, then the processing may not be performed at line speed, which may require queuing of the updated data packet.

Telemetry data can also be collected periodically to provide valuable insight into the overall state of a communication network that may include attached network nodes. However, conventional techniques used to collect telemetry data may not provide a per-service granularity. As a result, the telemetry data collected using conventional techniques may not be able to predict or correct behavior of the particular service or group of services.

The disclosed techniques may overcome at least some of these drawbacks by collecting telemetry information on-path when a packet of a service flow traverses a communication network and transporting the collected telemetry information. The communication network may include an overlay network that may include one or more layers of the virtualized network on top of a physical network.

Figure 1A:
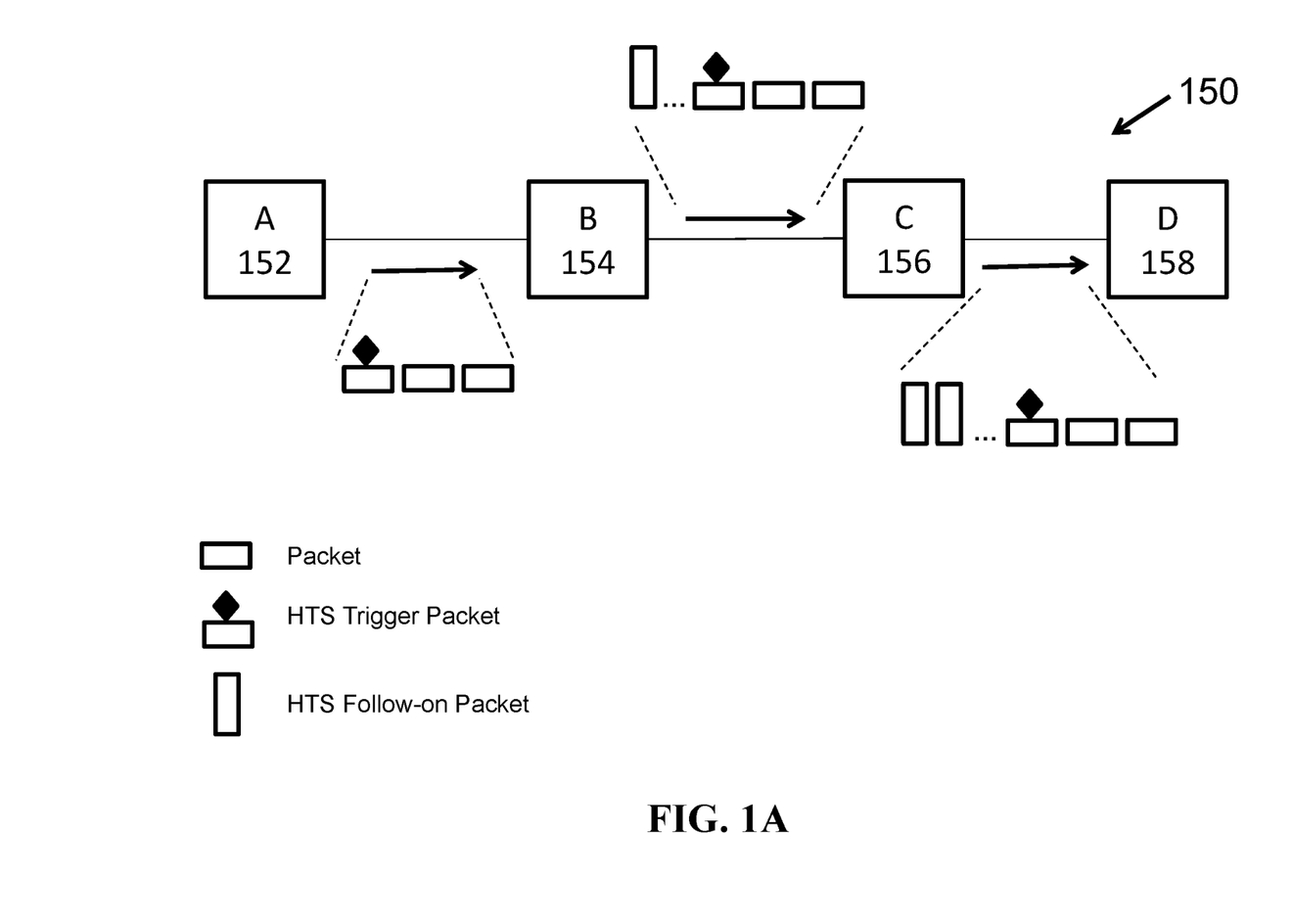
FIG. 1A shows an example block diagram of a communication network that employs a Hybrid Two-Step (HTS) process to collect and transport telemetry data.

FIG. 1A shows an example block diagram of a communication network that employs a Hybrid Two-Step (HTS) process to collect and transport telemetry data. The example communication network 100 may be an overlay network with four network nodes (Node A 152, Node B 154, Node C 156, and Node D 158). A network node may include a router, switch, or a computer host system or any other communication equipment in a communication network. In some embodiments, the techniques described in this patent document use an HTS process to collect and transport telemetry information when a packet of a service flow traverses a communication network.

For example, an operator may select Node B 154 as an ingress node and Node D 158 as an egress node to collect telemetry data associated with the one or more nodes in between Nodes B 154 and Node D 158. The functions associated with the ingress and egress nodes are further explained below. As shown in FIG. 1A, the operator's selection may initiate the process where Node A 152 generates a trigger packet to traverse Nodes B 154, C 156, and D 158 along with a group of packets. The packets sent by Node A 152 include two types of packets—a regular packet (e.g., IP packet) and an HTS trigger packet. An HTS trigger packet may be a regular IP packet of the given flow with an added mark or an indication (e.g., a flag or a bit value) that activates HTS operation on a network node. Additional packets may be sent from Node A 152 to Node B 154, and are omitted from FIG. 1A for the sake of clarity. The HTS trigger packet is constructed to trigger collection of telemetry data.

Upon receiving the HTS trigger packet, Node B 154 generates an HTS follow-up packet and collects the telemetry data. In this configuration, Node B 154 is considered an ingress HTS network node because it is configured to both generate a follow-up packet based on the received HTS trigger packet and collect telemetry data as a first network node. Node B 154 sends the two packets with the HTS trigger packet and the HTS follow-up packet to Node C 156, which is considered a transient HTS network node. The one or more follow-up packets may not immediately follow the trigger packet.

Figure 3A:
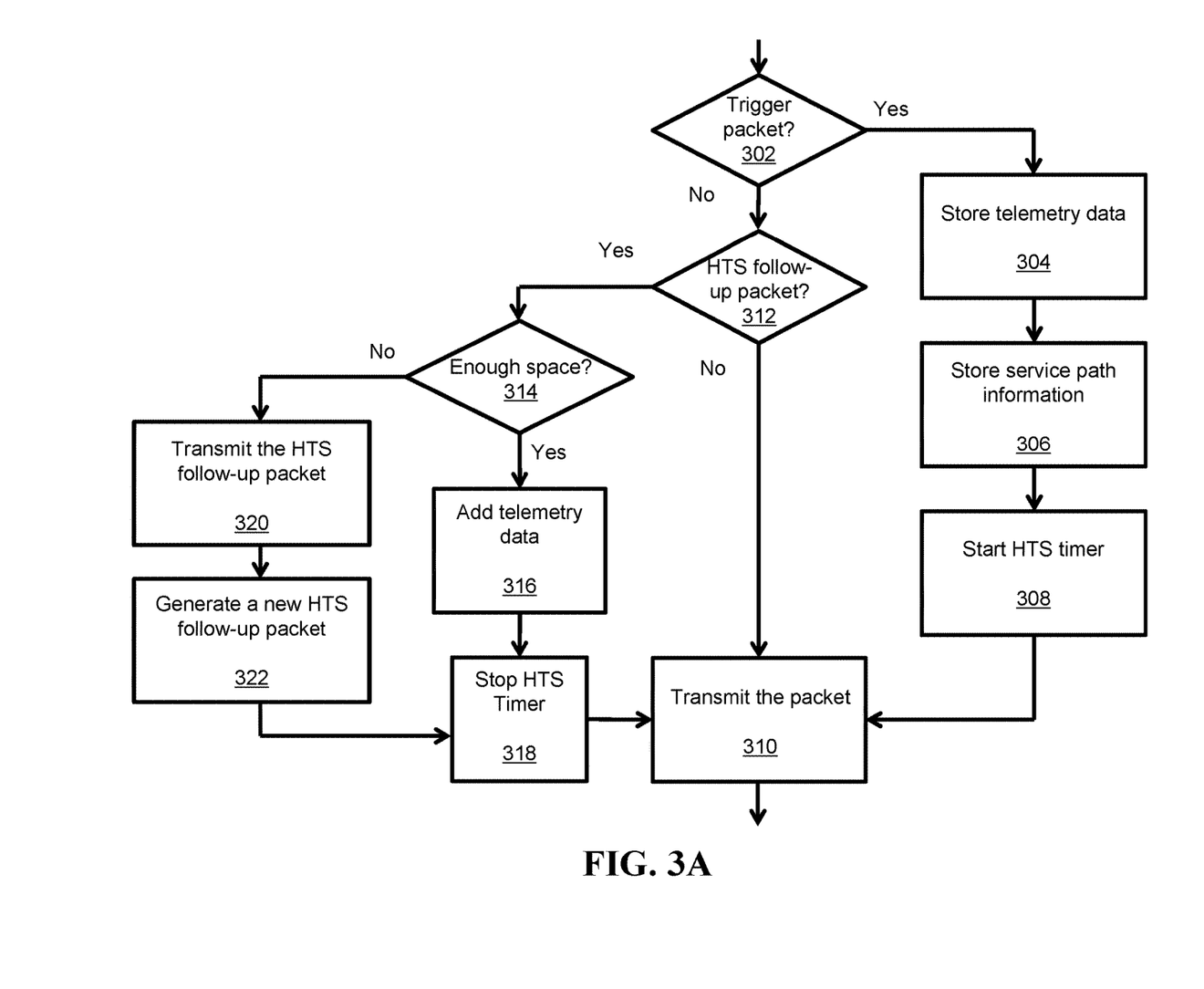
FIG. 3A shows an example flowchart of a transient network node processing a packet as part of an HTS process.

In some embodiments, as further described in FIG. 3A, upon receiving the HTS trigger packet, Node C collects the requested telemetry data, adds the collected telemetry data to the received HTS follow-up packet, and then transmits the packets to Node D 158. In some other embodiments, as further described in FIG. 3A, Node C may determine that the received HTS follow-up packet does not have sufficient space to include the telemetry data collected by Node C 156. In such cases, Node C may generate a second follow-up packet (as shown in FIG. 1A) and include the telemetry data of Node C 156 in the second follow-up packet. The HTS trigger packet and the one or more HTS follow-up packets share the same encapsulation. The HTS follow-up packets include an additional HTS shim as shown in FIG. 1B.

Figure 5A:
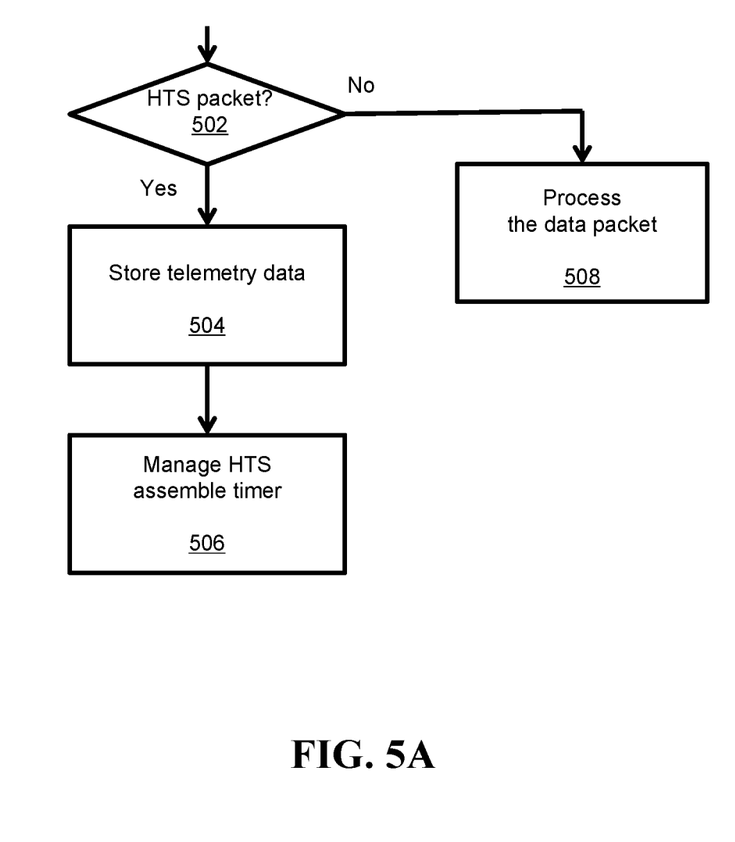
FIG. 5A shows an example flowchart of an egress network node processing a packet as part of an HTS process.
Figure 5B:
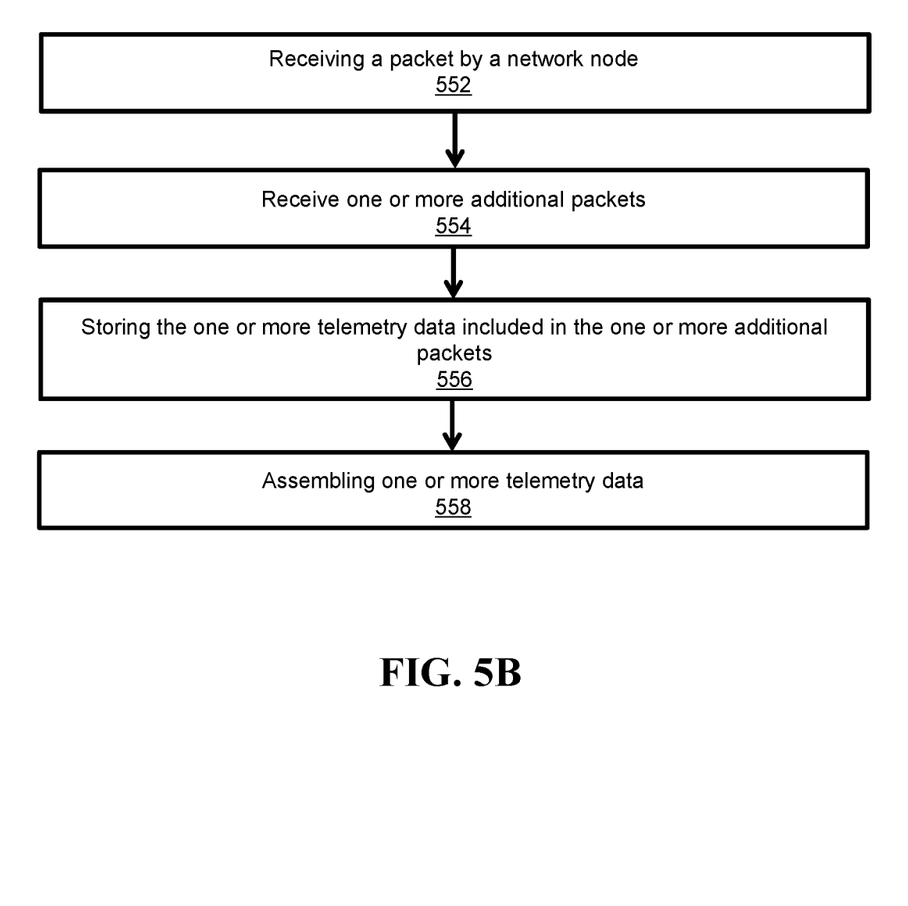
FIG. 5B further illustrates some of the features of the example flowchart shown in FIG. 5A of an egress network node processing a packet as part of an HTS process.

Node C 156 sends the packets, which include the HTS trigger packet and one or more HTS follow-up packet to Node D 158 that collects and assembles the telemetry data as described in FIGS. 5A and 5B. Node D 158 is considered an egress HTS network node because it collects and assembles telemetry data as the last network node to which the HTS trigger and follow-up packets are directed.

Figure 1B:
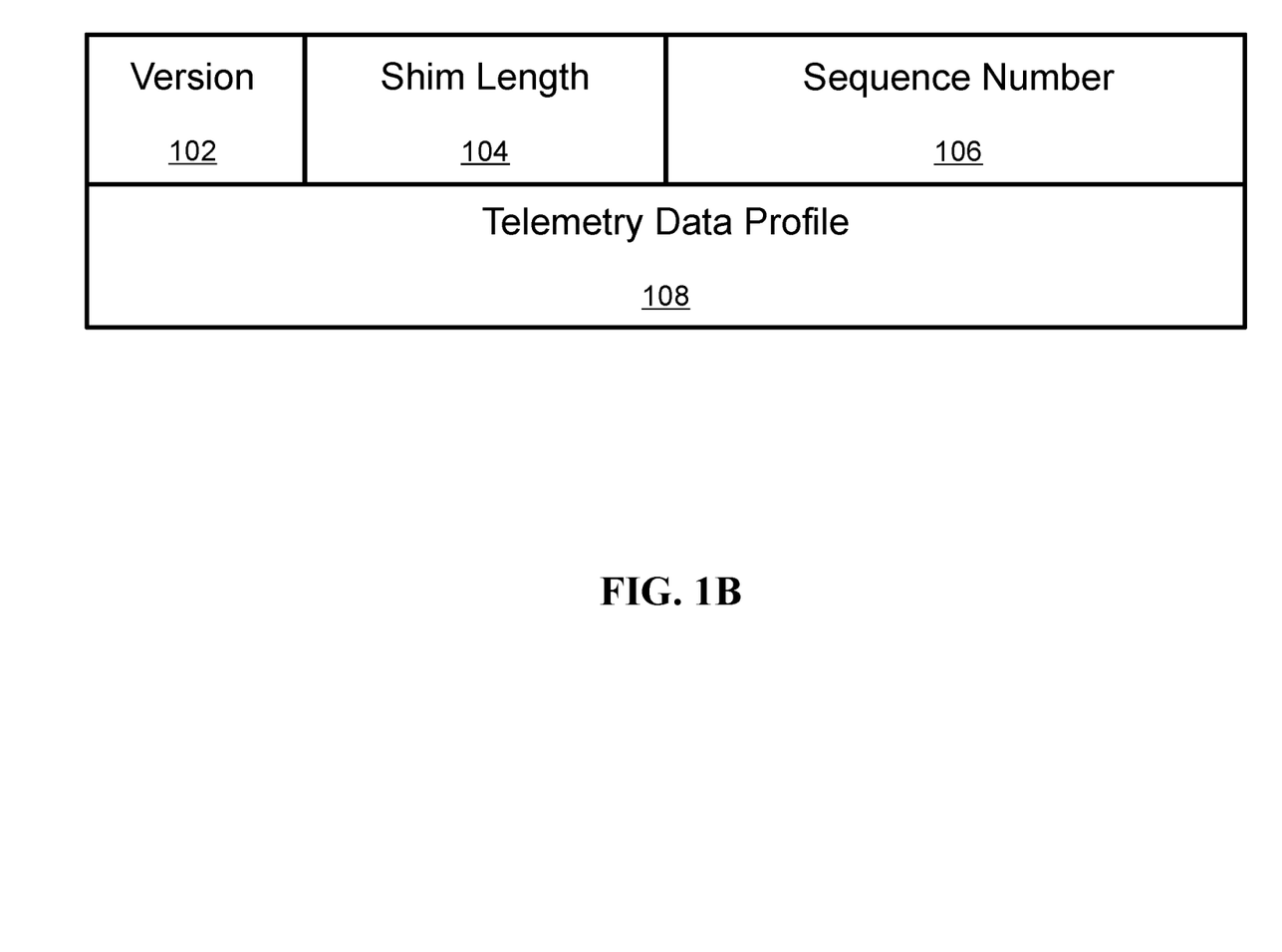
FIG. 1B shows an example metadata for an HTS follow-up packet used in an HTS process to collect telemetry data.

FIG. 1B shows an example metadata or "shim" for an HTS follow-up packet used in an HTS process to collect telemetry data. Version 102 indicates the version of the HTS shim format. Shim Length 104 indicates the length of the HTS shim that may be indicated using four octet-long words. The minimum value for the Shim Length 104 may be two. The Sequence Number 106 indicates the sequence number of a given HTS follow-up packet. The Sequence Number 106 indicates where a packet belongs in a sequence. The Telemetry Data Profile 108 may be a variable length bit string that may include encodings of one or more telemetry data to be included in an HTS follow-up packet. The HTS Shim may be followed by a sequence of telemetry data records related to the one or more telemetry data included in the Telemetry Data Profile 108. In some embodiments, the telemetry data records may be encoded as Type-Length-Value (TLV).

Figure 2A:
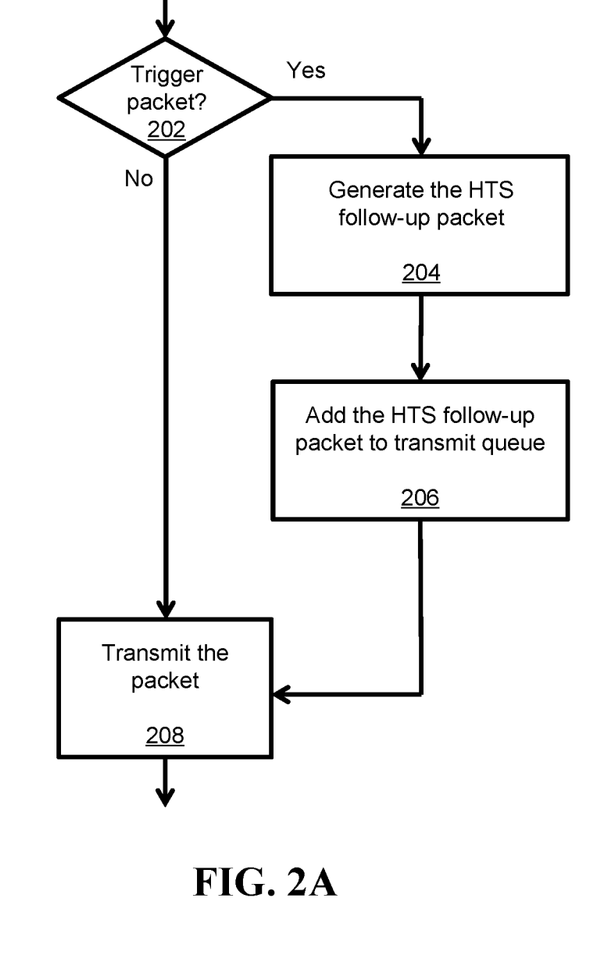
FIG. 2A shows an example flowchart of an ingress network node processing a packet as part of an HTS process.

FIG. 2A shows an example flowchart of an ingress network node processing a packet as part of an HTS process. The ingress network node described in this patent document may be an HTS network node configured to perform an HTS protocol. At the determining operation 202, the ingress network node receives a packet and determines whether the received packet is a trigger packet constructed to trigger collection of one or more telemetry data. The ingress network node may be configured to both generate an HTS follow-up packet based on the received HTS trigger packet and collect telemetry data as a first node among a series of two or more nodes traversed by one or more HTS packets in an on-path telemetry collection within a communication network domain. For example, in FIG. 1A, Node B 154 would be an ingress node because it receives a trigger packet and generates a follow-up packet, where the trigger packet traverses Nodes B 154, C 156, and D 158, and where the follow-up packet traverses Node C 156 and is consumed by Node D 158.

If the ingress network node determines that the received packet is a trigger packet, then the ingress network node generates the HTS follow-up packet at the generating operation 204, and collects the one or more telemetry data corresponding to the telemetry data profile (108 in FIG. 1B) included in the HTS-follow up packet. The ingress network node may determine that a received packet is a trigger packet based on a mark or an indication (e.g., a flag or a bit value) included in the trigger packet. The triggering of the HTS process based on a received trigger packet may be layer specific. For example, multi-protocol label switching (MPLS) has an element known as a synonymous label, which has the same meaning as the original, primary label but different value. The appearance of the synonymous label may be used as the trigger in the MPLS network. In domains that have accommodation for the Alternate Marking method, the alternative marking field may be used to identify the trigger HTS packet.

The ingress network node (and the transient network node as explained below) collects the one or more telemetry data to be included in the follow-up packet after determining that the received packet is a trigger packet. For example, once the ingress or transient network node determines the packet to be the trigger packet, the ingress or transient network node may collect the telemetry data, e.g., egress queue length or wall clock at the moment of reception of the trigger packet, and include the data in the originated follow-up packet. In some embodiments, the one or more telemetry data may be pre-configured to be collected by the ingress or transient network node to be included in the HTS follow-up packet. For example, the ingress or transient network node may store a default set of one or more telemetry data, then add a sub-set of the stored telemetry data to the follow-up based on the HTS Telemetry Data Profile included in the HTS follow-up packet. In some embodiments, the one or more telemetry data may be collected based on the Telemetry Data Profile (108 in FIG. 1B) of the HTS follow-up packet. For example, the Telemetry Data Profile of the HTS follow-up packet may be constructed based on an operator's selection of the one or more telemetry data to be collected. In some embodiments, the ingress or transient network node may continuously collect and store telemetry data, and in response to determining that the received packet is a trigger packet, retrieves the most recent one or more telemetry data to be included in the follow-up packet.

The ingress network node generates the HTS follow-up packet with an HTS Shim described in FIG. 1B. For example, the HTS follow-up packet includes a Sequence Number (106 in FIG. 1B) that may be set to zero and a Telemetry Data Profile. The HTS follow-up packet also includes the one or more telemetry data and the corresponding Telemetry Data Profile (108 in FIG. 1B) of the HTS follow-up packet, where the telemetry data may be encoded as TLV.

The ingress network node adds the HTS follow-up packet to the transmit queue at the adding operation 206, and transmits the HTS follow-up packet to another node at the transmitting operation 208. The ingress network node transmits the trigger packet to another node prior to transmitting the follow-up packet.

At the determining operation 202, if the ingress network node determines that the received packet is not a trigger packet or is different than a trigger packet, then the ingress network node transmits the packet to another network node at the transmitting operation 208.

Figure 2B:
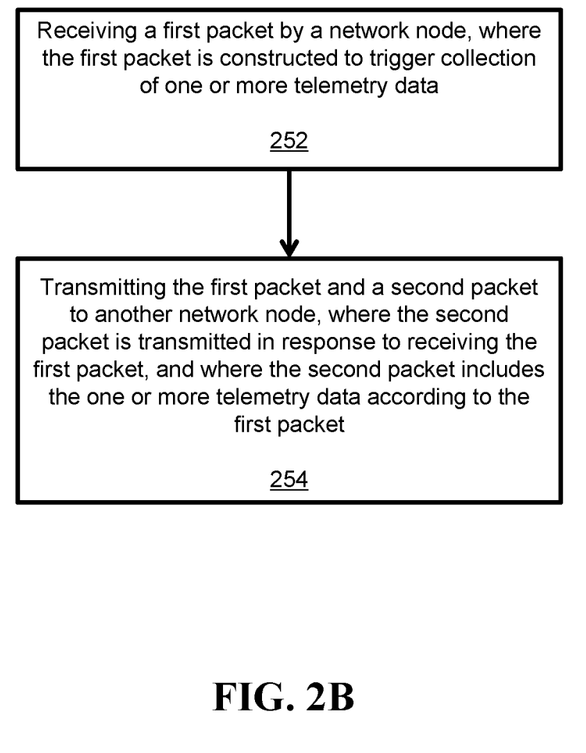
FIG. 2B further illustrates some of the features of the example flowchart shown in FIG. 2A of an ingress network node processing a packet as part of an HTS process.

FIG. 2B further illustrates some of the features of the example flowchart shown in FIG. 2A of an ingress network node processing a packet as part of an HTS process. At the receiving operation 252, a network node, such as an ingress network node, receives a first packet, where the first packet is constructed to trigger collection of one or more telemetry data.

At the transmitting operation 254, the first packet and a second packet is transmitted by the network node to another network node, where the second packet is transmitted in response to receiving the first packet, and where the second packet includes the one or more telemetry data according to the first packet. In some embodiments, the network node generates the second packet in response to receiving the first packet, and where the network node is a first network node in a series of one or more network nodes traversed by the first packet and the second packet. In some embodiments, the network node collects the one or more telemetry data to be included in the second packet in response to receiving the first packet. In some embodiments, the second packet includes metadata that includes a version indicator, a length of the metadata, a sequence number that indicates a sequence within which a packet belongs, and a telemetry data profile that indicates the one or more telemetry data included in the second packet.

FIG. 3A shows an example flowchart of a transient network node processing a packet as part of an HTS process. A transient network node may be configured to both collect telemetry data based on a trigger packet received from another node and add the collected telemetry data to the follow-up packet received from another node in an on-path telemetry collection within a communication network domain. The transient network node described in this patent document may be an HTS network node configured to perform an HTS protocol. As further explained below, the HTS transient network node may process a trigger packet, store one or more telemetry data, manage an HTS timer, and update or generate an HTS follow-up packet.

The transient network node receives a packet and performs a determining or receiving operation 302 where the transient network node determines whether the received packet is a trigger packet. Following the right-hand side of the flowchart, if the transient network node determines that the received packet is a trigger packet, then the transient network node stores or collects the one or more telemetry data at the storing operation 304. In some embodiments, each service flow may have no more than one set of the telemetry data pending transmission in an HTS follow-up packet. Operations related to the HTS follow-up packet are further described in 312-322 (discussed below).

The transient network node stores the service path information at the storing operation 306, and starts an HTS timer at the starting operation 308, and transmits the trigger packet at the transmitting operation 310 to another network node for further collection or processing of telemetry data. The service path information is obtained from the trigger packet and it provides information about the monitored service path. The HTS timer may be associated with a pre-defined value. As further explained in FIG. 4, the transient network node stores the service path information so that the node can generate and encapsulate a follow-up packet with the service path information if the transient node determines that the HTS timer has expired. By including in the follow-up packet the service path information from the trigger packet, the follow-up packet follows the same path as the trigger packet. The HTS Timer ensures that resources are not wasted for stale flows. While FIG. 3A shows that operations 304, 306, and 308 are performed one after another, the sequence of operation can be different. For example, the HTS timer may be started (i.e., starting operation 308) after the determining or receiving operation 302 and before the two storing operations 304 and 306.

At the determining or receiving operation 302, if the transient network node determines that the received packet is not a trigger packet or is different than the trigger packet, then the transient network node performs a second determining operation 312 where the node determines whether the received packet is an HTS follow-up packet. At the determining step 312, the HTS follow-up packet is received while the HTS timer is running. The transient network node may determine that a packet is an HTS follow-up packet based on a value in the HTS follow-up packet's encapsulation. For example, an HTS follow-up packet may be assigned a value for a Next Protocol field or the HTS follow-up packet may be assigned a value for an Operations, Administration, and Maintenance (OAM) Type field when the value of the Next Protocol field identifies the packet as OAM packet.

If the transient network node determines that the received packet is not an HTS follow-up packet or is different than the HTS follow-up packet, then the transient network node determines that the received packet is not related to an HTS process and transmits the packet at the transmitting operation 310 to another network node.

If the transient network node determines that the received packet is an HTS follow-up packet, then the transient network node performs a third determining operation 314 where the transient network node determines whether the received HTS-follow-up packet has enough space to add the telemetry data stored as part of the storing operation 304. If the transient network node determines that the received HTS-follow-up packet has enough space to add the stored or collected telemetry data, then the transient network node adds the stored or collected telemetry data to the HTS follow-up packet at the adding operation 316. Next, the transient network node stops the HTS timer at the stopping operation 318.

Following the left-hand side of the flowchart, if the transient network node determines that the received HTS-follow-up packet does not have enough space to add the stored telemetry data, then the transient network node obtains the service path information of the HTS follow-up packet, transmits the HTS follow up packet to the second network node at the transmitting operation 320, and generates a new HTS follow-up packet at the generating operation 322. As mentioned above, the second network node may collect or process telemetry data. The transient network node adds to the new HTS follow-up packet the HTS shim described in FIG. 1B, the obtained service path information from the transmitting operation 320, and the telemetry data stored or collected as part of the storing operation 304. Next, the transient network node stops the HTS timer at the stopping operation 318 and then transmits the new HTS follow-up packet to the second network node at the transmitting operation 310.

Figure 3B:
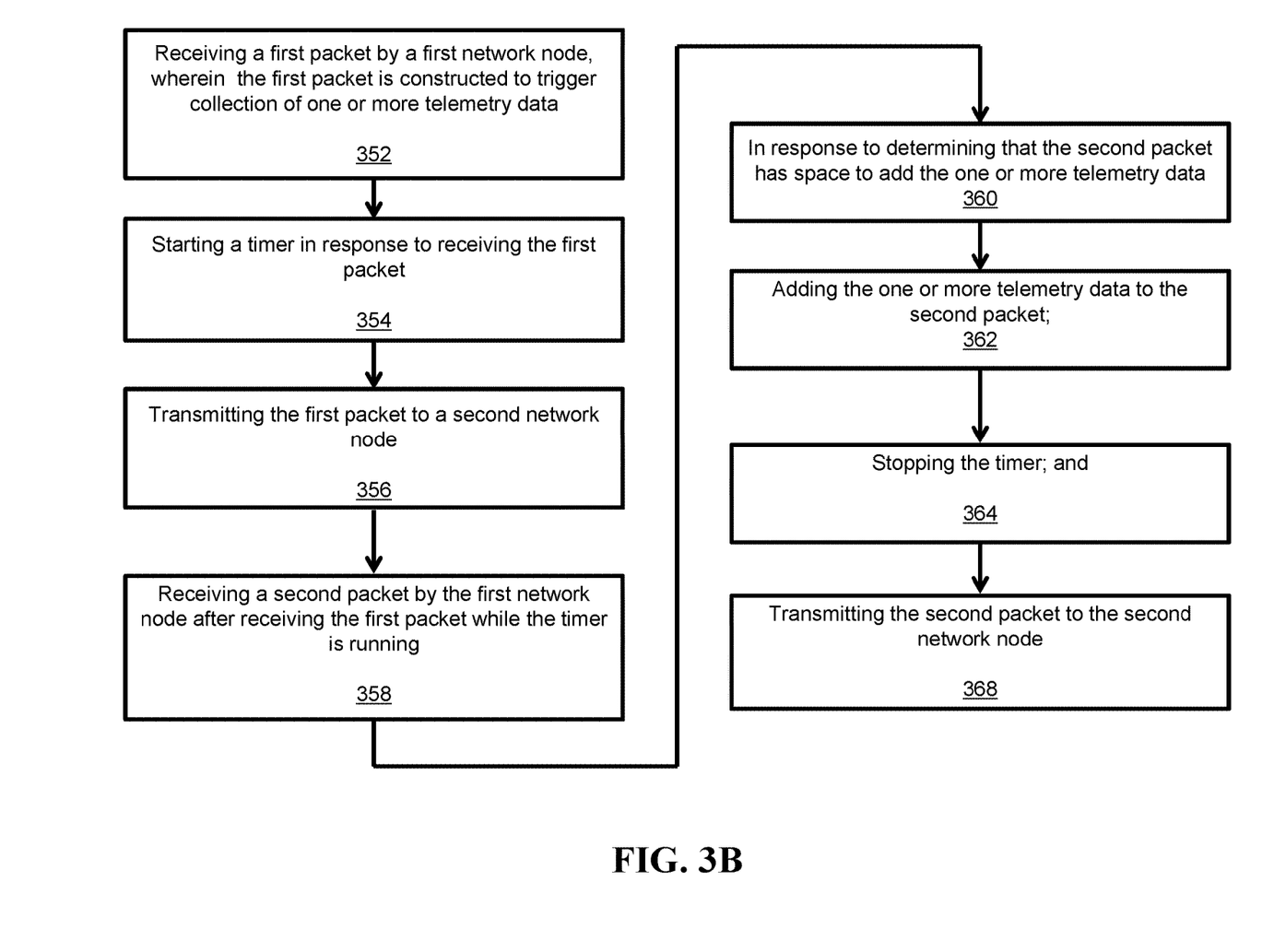
FIG. 3B further illustrates some of the features of the example flowchart shown in FIG. 3A of a transient network node processing a packet as part of an HTS process.

FIG. 3B further illustrates some of the features of the example flowchart shown in FIG. 3A of a transient network node processing a packet as part of an HTS process.

At the receiving operation 352, the first network node, such as a transient network node, receives a first packet, where the first packet is constructed to trigger collection of one or more telemetry data. In some embodiments, the first network node is configured to collect and send the one or more telemetry data based on the first packet received from another network node.

At the starting operation 354, the first network node starts a timer in response to receiving the first packet.

At the transmitting operation 356, the first network node transmits the first packet to a second network node.

At the second receiving operation 358, the first network node receives a second packet by the first network node after receiving the first packet while the timer is running. In some embodiments, the first network node collects the one or more telemetry data to be included in the second packet in response to receiving the first packet.

At the determining operation 360, the first network node performs operations 362 to 368, in response to determining that the second packet has space to add the one or more telemetry data.

At the adding operation 362, the first network node adds the one or more telemetry data to the second packet. At the stopping operation 364, the first network node stops the timer. At the transmitting operation 368, the first network node transmits the second packet to the second network node.

In some embodiments, the first network node, in response to determining that the second packet lacks space to add the one or more telemetry data performs the following operations: obtaining, from the second packet, a service path information that indicates a service path of the second packet, transmitting the second packet to the second network node, generating a third packet to include the service path information and the one or more telemetry data, stopping the timer, and transmitting the third packet to the second network node.

In some embodiments, the second packet and the third packet include metadata that includes a version indicator, a length of the metadata, a sequence number that indicates a sequence within which a packet belongs, and a telemetry data profile that indicates the one or more telemetry data included in the second or the third packets.

In some embodiments, the first network node, in response to receiving the first packet performs the following operations: storing a service path information that indicates a service path of the first packet, storing the one or more telemetry data, and transmitting the first packet to the second network node. In such embodiments, in response to determining, by the first network node, that the timer has expired, the first network node generates another packet, adds to another packet the service path information and the one or more telemetry data, and transmits another packet to the second network node.

Figure 4:
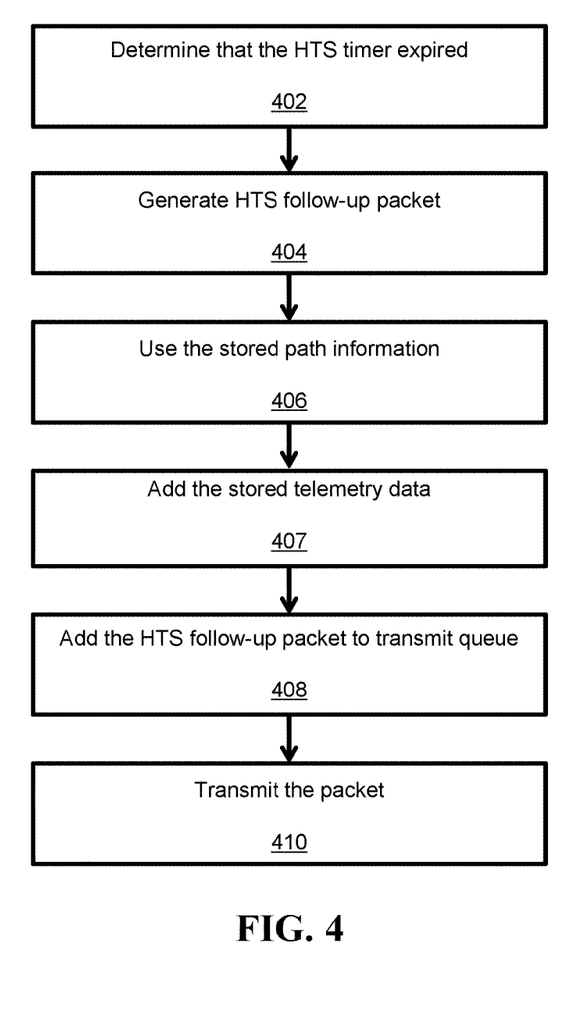
FIG. 4 shows an example flowchart of a transient network node managing an HTS timer a packet as part of an HTS process.

FIG. 4 shows an example flowchart of a transient network node managing an HTS timer a packet as part of an HTS process. At the determining operation 402, the transient network node determines that the HTS timer has expired. In response to the determining operation 402, the transient network node generates an HTS follow-up packet at the generating operation 404. At the using operation 406, the transient network node adds the stored service path information to the generated HTS follow-up packet. At the adding operation 407, the transient network node adds the stored telemetry data to the generated HTS follow-up packet. The telemetry data and the service path information are stored at operations 304 and 306 of FIG. 3A. The follow-up packet is added to a transmit queue at the adding operation 408, and the follow-up packet is transmitted to a second network node at the transmitting operation 410. The second network node may collect or process telemetry data.

FIG. 5A shows an example flowchart of an egress network node processing a packet as part of an HTS process. An egress network node may be configured to collect and assemble telemetry data as the last network node to which a packet is directed by the first node and/or any transient node in an on-path telemetry collection within a communication network domain. The egress network node described in this patent document may be an HTS network node configured to perform an HTS protocol. As further explained below, the egress network node may terminate the HTS packets (e.g., follow-up packet(s)), assemble the on-path telemetry data from the one or more follow-up packets, and transmit the assembled on-path telemetry data out-of-band for analysis by, for example, a software-defined network (SDN) controller. Since the trigger packet may be a data packet, the egress network node may clear the mark or indicator that indicates that the packet is an HTS trigger packet.

At the determining operation 502, the egress network node determines whether a received first packet is an HTS packet, such as a trigger packet that triggers collection of one or more telemetry data from one or more network nodes preceding the egress network node. After receiving the trigger packet, if the egress network node receives a second packet and determines that the second packet is a follow-up packet, then the egress network node stores the telemetry data included in the second packet at the storing operation 504. The egress network node starts the HTS assemble timer after receiving the second packet.

At the managing operation 506, the egress network node determines whether an HTS assemble timer has expired. If the egress network node determines that the HTS assemble timer has not expired, the egress network node may wait for any follow-up packets (in addition to the second packet) that are not yet received. In some embodiments, if the egress network node determines that one or more follow-up packets in addition to the second packet are received, then the egress network node stores the telemetry data included in each follow-up packet. The egress network node restarts the timer when it receives each of the one or more follow-up packets. By re-starting the assemble timer on reception of the one or more follow-up packets, rather allowing the assemble timer to run, the HTS convergence at the egress network node may be faster because the assemble timer value may be set to a value that allows for reception of a single follow-up packet. In some embodiments, the HTS assemble timer may be associated with a pre-defined value that may enable the egress network node to receive all of the follow-up packet(s) in the sequence in the network before the expiration of the assemble timer. The pre-defined value of the HTS assemble timer may be different from the pre-defined value of the HTS timer.

While the managing operation 506 is shown to follow the storing operation 504, in some embodiments, the egress network node may periodically check whether the assemble timer has expired which may be performed before the storing operation 504.

When the egress network node determines that the assemble timer has expired, the egress network node assembles the stored on-path telemetry data. In some embodiments, the telemetry data is reassembled in an order indicated by the sequence number included in the one or more follow-up packets. Next, the egress network node transmits the re-reassembled on-path telemetry data out-of-band to another node (e.g., SDN controller or closed-loop service assurance control system) for analysis. In some embodiments, the egress network node may assemble the telemetry data as part of the storing operation 504 so that when the egress network node determines that the assemble timer has expired, the egress network node sends the reassembled on-path telemetry data to another node for analysis.

The assemble timer may not be larger than an interval between two consecutive trigger packets in part because the assemble timer enables the egress network node to collect telemetry data from the one or more follow-up packets associated with a trigger packet, and because each service flow may have no more than one set of the telemetry data pending transmission in an HTS follow-up packet.

At the determining operation 502, if the egress network node determines that the received packet is not an HTS packet, then the egress network node processes the data packet at the processing operation 508.

FIG. 5B further illustrates some of the features of the example flowchart shown in FIG. 5A of an egress network node processing a packet as part of an HTS process.

At the receiving operation, a network node receives a packet, where the packet is constructed to trigger collection of one or more telemetry data from one or more additional network nodes, and where the network node may be an egress network node configured to collect and assemble the one or more telemetry data sent by the one or more additional network nodes.

At the second receiving operation 554, the network node receives one or more additional packets after receiving the packet. In some embodiments, the one or more additional packets includes metadata that includes a version indicator, a length of the metadata, a sequence number that indicates a sequence within which a packet belongs, and a telemetry data profile that indicates the one or more telemetry data included in the one or more additional packets.

At the storing operation 556, the network node stores the one or more telemetry data included in the one or more additional packets. At the assembling operation 558, the network node assembles the one or more telemetry data according to an order indicated by one or more sequence numbers included in the one or more additional packets.

In some embodiments, the network node starts or restarts a timer in response to receiving the one or more additional packets, where the one or more telemetry data is assembled in response to the network node determining that the timer has expired.

While FIGS. 2A and 2B describe operations related to an ingress network node, FIGS. 3A, 3B, and 4 describe operations related to a transient network node, and FIGS. 5A-5B describe operations related to an egress network node, in some embodiments, the same network node may perform operations associated with the ingress, transient, and egress network nodes as described in this patent document. For example, the same network node may simultaneously perform two roles for two service flows that may be different. In another example, the same network node may simultaneously perform all three roles for three service flows that may be different. In yet another example, a same network node may perform operations associated with an ingress network node at some time, an egress network node at some other time, and a transient node at yet another time.

Figure 6:
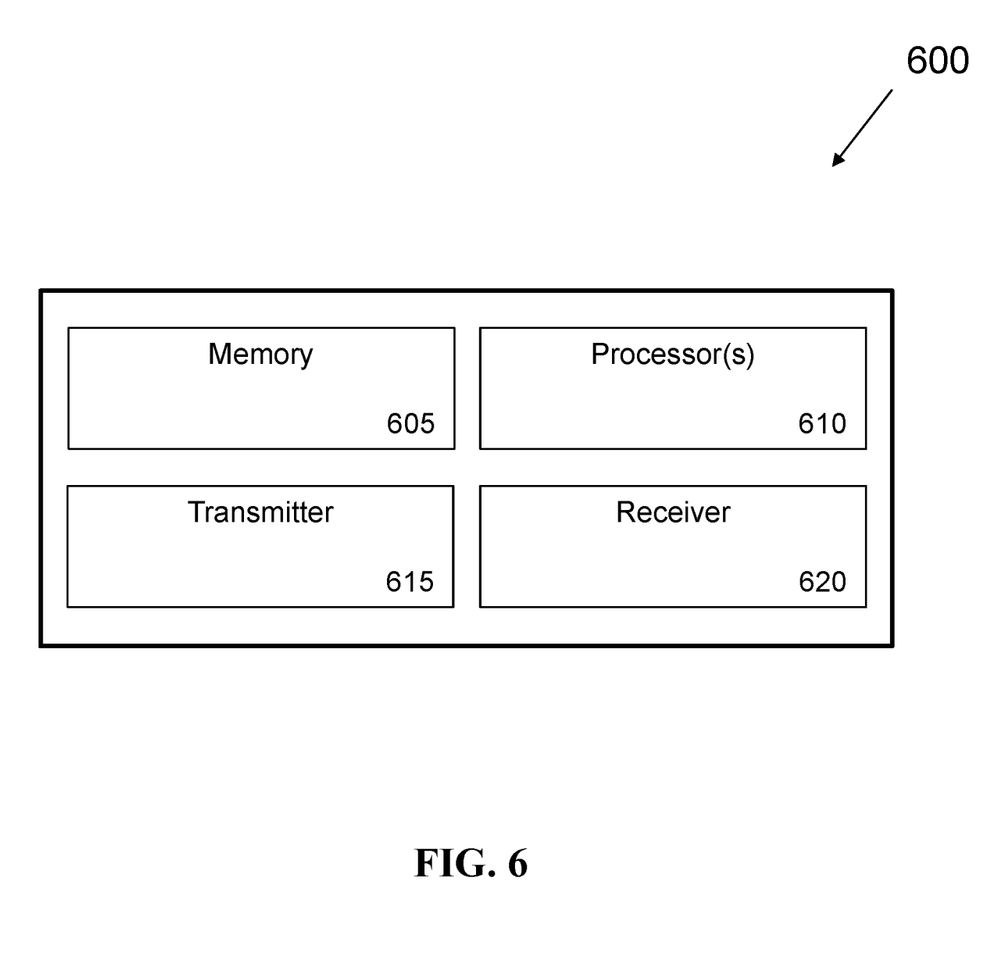
FIG. 6 shows an exemplary block diagram of a hardware platform that may be a part of a network node.

FIG. 6 shows an exemplary block diagram of a hardware platform 600 that may be a part of a network node, such as an ingress, transient, or egress network node. The hardware platform 600 includes at least one processor 610 and a memory 605 having instructions stored thereupon. The instructions upon execution by the processor 610 configure the hardware platform 600 to perform the operations described for FIGS. 1A to 5B and in the various embodiments described in this patent document. The transmitter 615 transmits or sends a packet to another node. For example, a network node transmitter can send a trigger packet to another network node. The receiver 620 receives the packet sent by another node. For example, a network node can receive a follow-up packet from another network node.

A network node may include a processor configured to implement a method. For example, a network node may be a first network node (e.g., transient network node) comprising a processor configured to implement a method comprising: receiving a first packet, where the first packet is constructed to trigger collection of one or more telemetry data, starting a timer in response to receiving the first packet, transmitting the first packet to a second network node, receive a second packet by the first network node after receiving the first packet while the timer is running, in response to determining that the second packet has space to add the one or more telemetry data: adding the one or more telemetry data to the second packet, stopping the timer, and transmitting the second packet to the second network node. The first network node may be configured to collect and send the one or more telemetry data based on the first packet received from another network node. The first network node collects the one or more telemetry data to be included in the second packet in response to receiving the first packet.

In some embodiments, in response to determining that the second packet lacks space to add the one or more telemetry data, the processor of the first network node further performs a method comprising: obtaining, from the second packet, a service path information that indicates a service path of the second packet, transmitting the second packet to the second network node, generating a third packet to include the service path information and the one or more telemetry data, stopping the timer, and transmitting the third packet to the second network node. In some embodiments, the second packet and the third packet include metadata that includes a version indicator, a length of the metadata, a sequence number that indicates a sequence within which a packet belongs, and a telemetry data profile that indicates the one or more telemetry data included in the second or the third packets.

In some embodiments, in response to receiving the first packet, the processor of the first network node performs a method comprising: storing a service path information that indicates a service path of the first packet, storing the one or more telemetry data, and transmitting the first packet to the second network node.

In some embodiments, in response to determining, by the first network node, that the timer has expired, the processor of the first network node performs a method comprising: generating another packet, adding to the another packet the service path information and the one or more telemetry data, and transmitting the another packet to the second network node.

As another example, a network node may be an egress network node comprising a processor configured to implement a method comprising: receiving a packet by the network node, where the packet is constructed to trigger collection of one or more telemetry data from one or more additional network nodes, and where the network node is configured to collect and assemble the one or more telemetry data sent by the one or more additional network nodes, receiving, by the network node, one or more additional packets after receiving the packet, storing the one or more telemetry data included in the one or more additional packets, and assembling the one or more telemetry data according to an order indicated by one or more sequence numbers included in the one or more additional packets.

In some embodiments, the processor of the egress network node may be configured to start or restart a timer in response to receiving the one or more additional packets, where the one or more telemetry data is assembled in response to determining that the timer has expired. In some embodiments, the one or more additional packets includes metadata that includes a version indicator, a length of the metadata, a sequence number that indicates a sequence within which a packet belongs, and a telemetry data profile that indicates the one or more telemetry data included in the one or more additional packets.

The techniques disclosed in this patent document provide several benefits by using a sequence of specially constructed one or more packets to provide an on-path collection of the telemetry data. For example, the disclosed techniques can optimize bandwidth utilization by collecting telemetry data from one or more nodes into a same special packet, up to a maximum transmission unit (MTU) size. The disclosed techniques can also provide consistency of the collected information by the in-order assembly of on-path telemetry data. Further, the disclosed techniques can minimize the need to configure profile of the collected telemetry data to the first node only. The disclosed techniques can also monitor performance as experienced by the particular service as part of a closed-loop control structure for service life-cycle management.

The term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements, and variations can be made based on what is described and illustrated in this disclosure.

What is claimed is:

1. A packet communication method performed by a first network node, comprising:
   receiving a first packet that is constructed to trigger collection of one or more telemetry data, wherein the first packet is configured to traverse one or more network nodes;
   starting a timer in response to receiving the first packet;
   transmitting the first packet;
   receiving a second packet after receiving the first packet while the timer is running;
   in response to determining that the second packet has space to add the one or more telemetry data:
      adding the one or more telemetry data to the second packet;
      stopping the timer; and
      transmitting the second packet; and
   in response to determining that the second packet lacks space to add the one or more telemetry data:
      obtaining, from the second packet, a service path information that indicates a service path of the second packet;
      transmitting the second packet;

generating a third packet to include the service path information and the one or more telemetry data;
stopping the timer; and
transmitting the third packet.

2. The packet communication method of claim 1, wherein the network node is configured to collect and send the one or more telemetry data based on the first packet received from another network node.

3. The packet communication method of claim 1, wherein the network node collects the one or more telemetry data to be included in the second packet in response to receiving the first packet.

4. The packet communication method of claim 1, wherein the second packet and the third packet include metadata that includes a version indicator, a length of the metadata, a sequence number that indicates a sequence within which a packet belongs, and a telemetry data profile that indicates the one or more telemetry data included in the second or the third packets.

5. The packet communication method of claim 1, wherein in response to receiving the first packet:
storing a service path information that indicates a service path of the first packet;
storing the one or more telemetry data; and
transmitting the first packet.

6. The packet communication method of claim 5, further comprising:
in response to determining, by the first network node, that the timer has expired:
generating another packet;
adding to the another packet the service path information and the one or more telemetry data; and
transmitting the another packet.

7. A network node comprising a processor configured to:
receive a first packet that is constructed to trigger collection of one or more telemetry data, wherein the first packet is configured to traverse one or more network nodes;
start a timer in response to receiving the first packet;
transmit the first packet;
receive a second packet after receiving the first packet while the timer is running;
in response to a determination that the second packet has space to add the one or more telemetry data:
add the one or more telemetry data to the second packet;
stop the timer; and
transmit the second packet; and
in response to determination that the second packet lacks space to add the one or more telemetry data:
obtain, from the second packet, a service path information that indicates a service path of the second packet;
transmit the second packet;
generate a third packet to include the service path information and the one or more telemetry data;
stop the timer; and
transmit the third packet.

8. The network node of claim 7, wherein the processor is configured to collect and send the one or more telemetry data based on the first packet received from another network node.

9. The network node of claim 7, wherein the processor is configured to collect the one or more telemetry data to be included in the second packet in response to receiving the first packet.

10. The network node of claim 7, wherein the second packet and the third packet include metadata that includes a version indicator, a length of the metadata, a sequence number that indicates a sequence within which a packet belongs, and a telemetry data profile that indicates the one or more telemetry data included in the second or the third packets.

11. The network node of claim 7, wherein in response to receiving the first packet, the processor is further configured to:
store a service path information that indicates a service path of the first packet;
store the one or more telemetry data; and
transmit the first packet.

12. The network node of claim 11, wherein the processor is further configured to:
in response to determination that the timer has expired:
generate another packet;
add to the another packet the service path information and the one or more telemetry data; and
transmit the another packet.

13. A non-transitory computer readable program storage medium having code stored thereon, the code, when executed by a processor, causing the processor to implement a method performed by a network node, comprising:
receiving a first packet that is constructed to trigger collection of one or more telemetry data, wherein the first packet is configured to traverse one or more network nodes;
starting a timer in response to receiving the first packet;
transmitting the first packet;
receiving a second packet after receiving the first packet while the timer is running;
in response to determining that the second packet has space to add the one or more telemetry data:
adding the one or more telemetry data to the second packet;
stopping the timer; and
transmitting the second packet; and
in response to determining that the second packet lacks space to add the one or more telemetry data:
obtaining, from the second packet, a service path information that indicates a service path of the second packet;
transmitting the second packet;
generating a third packet to include the service path information and the one or more telemetry data;
stopping the timer; and
transmitting the third packet.

14. The non-transitory computer readable program storage medium of claim 13, wherein the network node is configured to collect and send the one or more telemetry data based on the first packet received from another network node.

15. The non-transitory computer readable program storage medium of claim 13, wherein the network node collects the one or more telemetry data to be included in the second packet in response to receiving the first packet.

16. The non-transitory computer readable program storage medium of claim 13, wherein the second packet and the third packet include metadata that includes a version indicator, a length of the metadata, a sequence number that indicates a sequence within which a packet belongs, and a telemetry data profile that indicates the one or more telemetry data included in the second or the third packets.

17. The non-transitory computer readable program storage medium of claim 13, wherein in response to receiving the first packet:
   storing a service path information that indicates a service path of the first packet;
   storing the one or more telemetry data; and
   transmitting the first packet.

18. The non-transitory computer readable program storage medium of claim 17, wherein the method further comprises:
   in response to determining, by the network node, that the timer has expired:
   generating another packet;
   adding to the another packet the service path information and the one or more telemetry data; and
   transmitting the another packet.

* * * * *

UNITED STATES PATENT AND TRADEMARK OFFICE
CERTIFICATE OF CORRECTION

PATENT NO. : 10,979,787 B2  
APPLICATION NO. : 16/127213  
DATED : April 13, 2021  
INVENTOR(S) : Gregory Mirsky Page 1 of 1

It is certified that error appears in the above-identified patent and that said Letters Patent is hereby corrected as shown below:

In the Specification

In Column 4, Line 52, delete "network 100" and insert -- network 150 --, therefor.

In Column 11, Line 29, delete "operation," and insert -- operation 552, --, therefor.

In Column 13, Line 51, delete "discs (DVD)," and insert -- discs (DVDs), --, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*